United States Patent
Meggiolan (10) Patent No.: US 9,533,731 B2
(45) Date of Patent: Jan. 3, 2017

(54) BICYCLE HANDLEBARS WITH PORTION WITH DOUBLED SECTION

(75) Inventor: Mario Meggiolan, Creazzo (IT)

(73) Assignee: Campagnolo S.R.L., Vicenza (IT)

( * ) Notice: Subject to any disclaimer, the term of this patent is extended or adjusted under 35 U.S.C. 154(b) by 0 days.

(21) Appl. No.: 13/486,654

(22) Filed: Jun. 1, 2012

(65) Prior Publication Data

US 2012/0304803 A1    Dec. 6, 2012

(30) Foreign Application Priority Data

Jun. 1, 2011 (EP) .................................. 11425149

(51) Int. Cl.
| B62K 21/12 | (2006.01) |
| B62K 19/16 | (2006.01) |
| B62K 19/48 | (2006.01) |

(52) U.S. Cl.
CPC ............... *B62K 19/48* (2013.01); *B62K 19/16* (2013.01); *B62K 21/12* (2013.01); *Y10T 74/2078* (2015.01)

(58) Field of Classification Search
CPC ....... B62K 21/145; B62K 21/12; B62K 19/10; B62K 19/32; B62K 19/12; B62K 19/48; B62K 19/16; B62K 19/02; B62K 3/06; B62K 3/08; B62K 3/10; B62K 3/14; Y10T 74/2078; Y10T 74/2081
USPC ..... 74/551.1, 551.4, 551.6, 551.9, 557, 543, 74/548, 544; 16/430; 280/279, 280
See application file for complete search history.

(56) References Cited

U.S. PATENT DOCUMENTS

| 5,257,552 A | 11/1993 | Boyer et al. |
| 5,269,196 A * | 12/1993 | Rafac ........................... 74/551.1 |
| 5,557,982 A * | 9/1996 | Voss et al. ................... 74/551.1 |
| 5,782,139 A | 7/1998 | Fraiman |
| 5,931,049 A * | 8/1999 | Tsai ............................. 74/551.3 |
| 6,609,437 B2 * | 8/2003 | Jiang ............................ 74/551.1 |
| 6,764,246 B1 | 7/2004 | Chiang |
| 7,651,110 B2 | 1/2010 | Davis |
| 8,876,137 B2 * | 11/2014 | Nicol ......................... 280/281.1 |
| 2003/0066376 A1 * | 4/2003 | Jiang ............................ 74/551.1 |
| 2003/0094067 A1 | 5/2003 | Whiting |
| 2004/0074332 A1 * | 4/2004 | Jiang ............................ 74/551.1 |
| 2005/0268742 A1 * | 12/2005 | Koike ........................... 74/551.1 |
| 2008/0079235 A1 | 4/2008 | Chao et al. |

(Continued)

FOREIGN PATENT DOCUMENTS

| BE | 486964 A | 2/1948 |
| CN | 2581305 Y | 10/2003 |

(Continued)

OTHER PUBLICATIONS

European Search Report for Appln. No. 11425149.9-2424, dated Apr. 23, 2012.

(Continued)

*Primary Examiner* — Adam D Rogers
(74) *Attorney, Agent, or Firm* — Volpe and Koenig, P.C.

(57) ABSTRACT

Handlebars having a master tube, two handgrips at opposite ends of the master tube, a stem for attaching to a fork, and at least one portion with doubled section, the cross section of which comprises an upper outer wall, a lower outer wall, an upper inner wall and a lower inner wall. The upper outer wall is distanced from and joined to the upper inner wall, the lower outer wall is distanced from and joined to the lower inner wall, and the upper inner wall is distanced from the lower inner wall.

6 Claims, 9 Drawing Sheets

(56) References Cited

U.S. PATENT DOCUMENTS

| | | |
|---|---|---|
| 2009/0049949 A1 | 2/2009 | Chen |
| 2009/0056495 A1 | 3/2009 | Bischoff et al. |
| 2010/0313702 A1 | 12/2010 | Uimonen |

FOREIGN PATENT DOCUMENTS

| | | |
|---|---|---|
| CN | 201026980 Y | 2/2008 |
| DE | 402384 C | 9/1924 |
| DE | 1720419 U | 4/1956 |
| DE | 9200215 U1 | 4/1992 |
| JP | S13003621 Y | 3/1938 |
| JP | S63155790 | 10/1988 |
| TM | M343634 U | 11/2008 |
| TW | I265893 B | 11/2006 |
| TW | M308897 U | 4/2007 |
| WO | 2010142638 A1 | 12/2010 |

OTHER PUBLICATIONS

European Office Action dated Sep. 2, 2013 in corresponding EP Application No. 11 425 149.9.
Japanese Office Action for Application No. 2012-124028, with English translation, dated Feb. 23, 2016.

\* cited by examiner

BICYCLE HANDLEBARS WITH PORTION WITH DOUBLED SECTION

BACKGROUND

The present invention refers to bicycle handlebars. Typically, bicycle handlebars comprise a master tube, two handgrips at opposite ends of the master tube, and a stem for attaching the handlebars to a fork associated with the front wheel of the bicycle.

In the field of bicycles, there has always been a need to reduce the weight of every component, so as to reduce the effort that the cyclist must make. In particular, this requirement is very important in the case of racing bicycles. In order to reduce the weight, increasing use is made of materials that combine lightness and mechanical strength, like so-called composite materials, but of course the search to gain the maximum weight reduction can lead to the risk of an unacceptable reduction in strength.

If, for whatever reason, the strain to which a component is subjected exceeds its mechanical strength and yielding does occur, this can have more or less serious consequences for the cyclist. In particular, if it is the handlebars that yield, the situation for the cyclist is extremely dangerous, because it can lead to the sudden and total loss of control of the bicycle.

The danger for the cyclist is increasingly great depending on how sudden the excessive strain causes a sudden yielding, as typically occurs with composite materials based on carbon fibers.

There is therefore the problem of reducing the risks for the cyclist in the case in which an excessive strain leads to the handlebars yielding.

SUMMARY OF THE INVENTION

The invention concerns bicycle handlebars comprising a master tube with handgrips at its opposite ends and a stem for attaching the handlebar to a front wheel fork. The handlebar has upper and lower outer walls and upper and lower inner walls and at least one portion with doubled section.

BRIEF DESCRIPTION OF THE DRAWINGS

Further characteristics and advantages of the invention will become clearer from the following description made with reference to the attached drawings. In such drawings.

DESCRIPTIONS OF THE PREFERRED EMBODIMENTS

Introduction

The handlebars of the present invention include a master tube that defines an attachment point and handgrips at its opposite ends. It also includes a stem for attaching the handlebar to a bicycle fork. The handlebar has at least a portion with doubled section where there are upper and lower outer walls and upper and lower inner walls. The walls are arranged such the upper outer wall is distanced from and joined to the upper inner wall, the lower outer wall is distanced from and joined to the lower inner wall, and the upper inner wall is distanced from the lower inner wall.

This doubled section structure provides two desirable results. First, with a suitable relative sizing with respect to the rest of the handlebars, it is possible to ensure that this portion is the weakest one, where a possible yielding would occur in the case of excessive strain. Moreover, thanks to the presence of a large number of walls in the section, the possible yielding intrinsically occurs relatively gradually, involving first one wall and then the others in succession, thus giving the cyclist the time to become aware of the danger and act accordingly, reducing the risk of suffering injury.

Preferably, in the portion with doubled section, the upper outer wall and the upper inner wall form an upper tubular structure, the lower outer wall and the lower inner wall form a lower tubular structure. The two upper and lower tubular structures being distinct and distanced from one another, with formation of a gap that passes through the portion with doubled section. In this way, two substantially independent strong structures with closed profile are made, which ensure excellent mechanical strength, whilst allowing independent sizing.

Preferably, the upper and lower tubular structures have a rounded and elongated section, with the outer walls extending predominantly along a circumference section and the inner walls extending predominantly along respective lines, distanced apart from one another. The overall outer shape is thus close to that of a single circular tubular structure, but the elongated shape of each tubular structure makes it possible to have lower aerodynamic resistance, which is always a welcome characteristic on a bicycle, particularly a racing bicycle.

Preferably, the lines along which the inner walls predominantly extend are straight lines, so as to minimise the aerodynamic resistance and to reduce the risk of producing irritating whistling or noises due to the passage of air.

In a preferred embodiment, the handlebars comprise two joining walls, which connect together the upper and lower outer walls forming a single circular wall. A simply circular external shape is thus created, suitable for example for coupling with supports for accessories and the like, whilst maintaining the structure with multiple walls that ensures the aforementioned advantages in terms of strength and control of possible yielding.

One or more doubled portions can be provided in different areas of the handlebars.

In a preferred embodiment, one of said portions with doubled section is provided at a middle area of the master tube, where the master tube is connected to the stem. If the stem is not formed in one piece with the master tube but it is an independent component, clamped onto the middle area of the master tube, the presence of a portion with doubled section at this middle area ensures excellent strength with respect to the clamping forces of the stem on the master tube; if—as sometimes occurs—these clamping forces are predominantly oriented in one direction, the best results will be obtained by orienting the two inner walls in that direction, so as to have the greatest strength in the direction in which the greatest strains occur.

Preferably, said portion with doubled section extends both at the middle area of the master tube, where the master tube is connected to the stem, and at its sides, towards the ends of the master tube. In this way, the advantages of strength increase particularly in the middle area, where the stem is fixed, whereas at the sides thereof the aerodynamic advantages are significant.

Preferably, said portion with doubled section extends for no more than half of the length of the master tube. Indeed, it is considered that it is necessary to keep a substantial part of the master tube, equal to at least half of the length, in a single section, in order to prevent that the two structures determined by the doubled section tend to deform and move with respect to one another.

In a preferred embodiment, two of said portions with doubled section are provided between a middle area of the master tube, where the master tube is connected to the stem, and the ends of the master tube. This configuration makes it possible both to have the aerodynamic advantages outlined above, and to leave the portions with doubled section in clearly visible position, so as to be able to immediately see when yielding is occurring.

The portions with doubled section can extend to a greater or lesser extent in the direction of the length of the master tube. Preferably, the two portions with doubled section extend overall for no more than half of the length of the master tube; this ensures that a high overall solidity of the handlebars is maintained, thus without there being the risk of deformations that can lead to the two tubular structures moving apart or towards one another.

In a preferred embodiment, said portion with doubled section is provided in the stem. Indeed, it has been observed that in certain situations it is precisely the stem that is the portion of the handlebars most subjected to stress and thus at greatest risk of sudden yielding. Preferably, said portion with doubled section extends for no more than half of the length of the stem, to keep the overall solidity of the stem itself.

In another preferred embodiment, the stem is formed in a single piece with the master tube and there is a single said portion with doubled section, extending both on the stem and on the master tube. This solution gives the handlebars the best aerodynamic penetration.

Preferably, said single portion with doubled section extends for no more than half of the length of the stem and for no more than half of the length of the master tube, for the reasons outlined above.

The handlebars can be made from different materials, but the invention is particularly advantageous when the master tube is made from composite material, with structural fibers bound by a resin matrix and/or when the stem is made from composite material, with structural fibers bound by a resin matrix. Indeed, it is with this type of materials that the problems due to possible sudden structural yielding most commonly occur.

DETAILED DESCRIPTION OF REFERRED EMBODIMENTS

In FIGS. 1 to 5, a front part of handlebars, facing in the usual direction of travel, is generally indicated with 100, comprising a master tube 110 at the opposite ends of which two handgrips 180 are provided. The two handgrips 180 are of the curved type, and they are formed in a single piece with the master tube 110; this configuration is typical of a racing bicycle, for competitions; of course, the handgrips 180 could be any other shape, for example straight. The part of handlebars 100, in the area around 130, is intended to be mounted on a fork of a bicycle by means of a stem, not shown in FIGS. 1-5.

The master tube 110 comprises at least one portion with doubled section 120, in which the cross section of the master tube 110 comprises an upper outer wall 121, a lower outer wall 122, an upper inner wall 123 and a lower inner wall 124. The upper outer wall 121 is distanced from and joined to the upper inner wall 123 and together they preferably form an upper tubular structure 125, having a closed section, rounded and elongated in the longitudinal direction of the handlebars (by this meaning, here and hereafter, the longitudinal direction of travel of the bicycle, as is common practice in the field of cycling both when referring to a bicycle or to a component thereof). Similarly, the lower outer wall 122 is distanced from and joined to the lower inner wall 124 and together they preferably form a lower tubular structure 126, having a closed section, rounded and elongated in the longitudinal direction of the handlebars. The upper inner wall 123 is spaced from the lower inner wall 124 and the two upper and lower tubular structures 125 and 126 are distinct and spaced apart; between the tubular structures 125 and 126 a gap 127 is formed that passes through the portion 120 with doubled section. Preferably, the outer walls 121 and 122 extend predominantly along sections of the same circumference, whereas the inner walls 123 and 124 extend predominantly along respective lines, straight or almost straight.

The portion with doubled section 120 has a middle area 130 thereof, provided at a middle area of the master tube 110, where the master tube 110 is intended to be connected to the stem; in the middle area 130, the portion with doubled section 120 comprises two joining walls 131 and 132, which connect together the upper and lower outer walls 121 and 123 forming a single circular wall with them. The central area 130 is flanked on both sides by two side areas 140, in which there are no joining walls between the outer walls 121 and 123. The inner walls 123 and 124 are preferably joined together between each side area 140 and the middle area 130, as well as between each side area 140 and the outer portions of the master tube 110, where the portion with doubled section 120 finishes. In this way, in the side areas 140 respective windows 141 are formed, open in the longitudinal direction both forwards and backwards.

The overall extension of the doubled section 120 along the master tube 110 is preferably equal to no more than half of the length of the master tube 110 itself.

Figure 1:
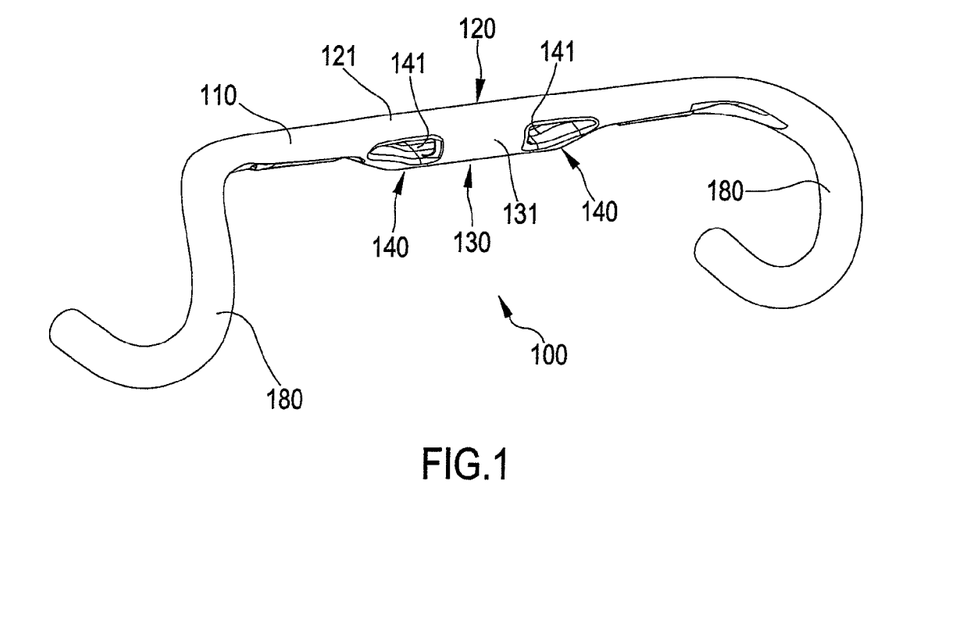
FIG. 1 is a perspective view of a front part of handlebars (master tube and handgrips) according to an embodiment of the invention.
Figure 2:
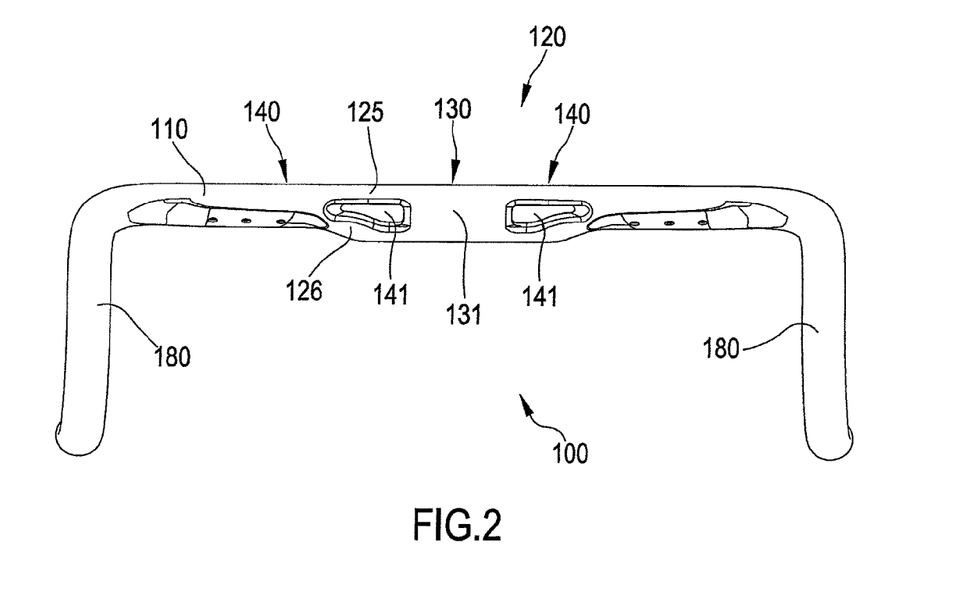
FIG. 2 is a front view of the part of handlebars of FIG. 1.
Figure 3:
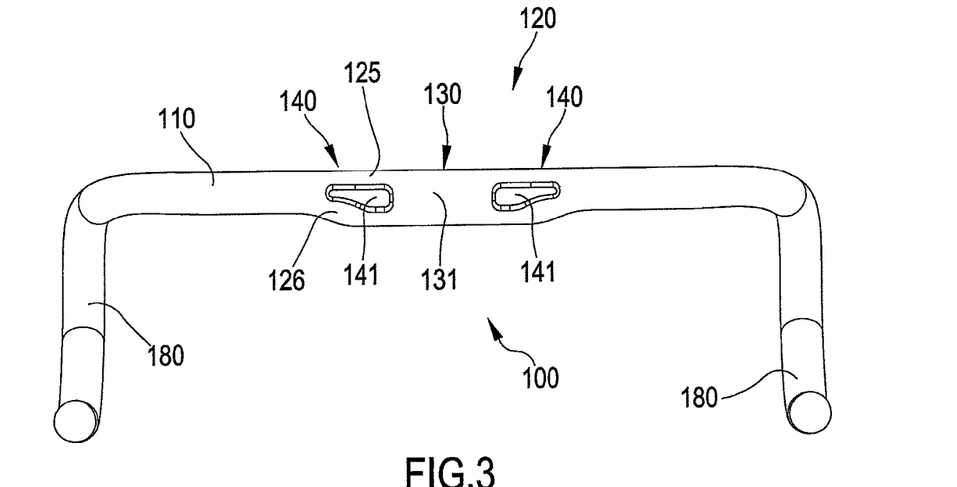
FIG. 3 is a rear view of the part of handlebars of FIG. 1.
Figure 4:
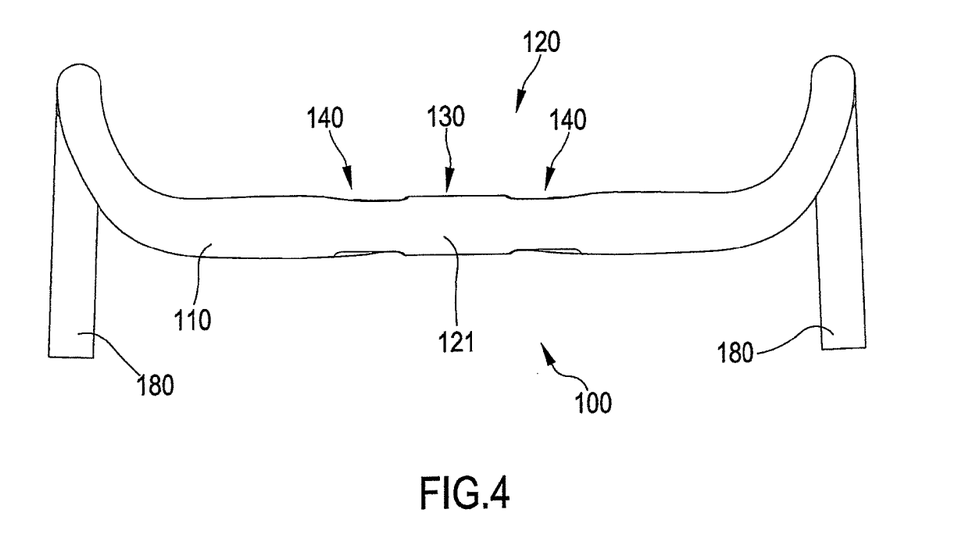
FIG. 4 is a view from above of the part of handlebars of FIG. 1.
Figure 5:
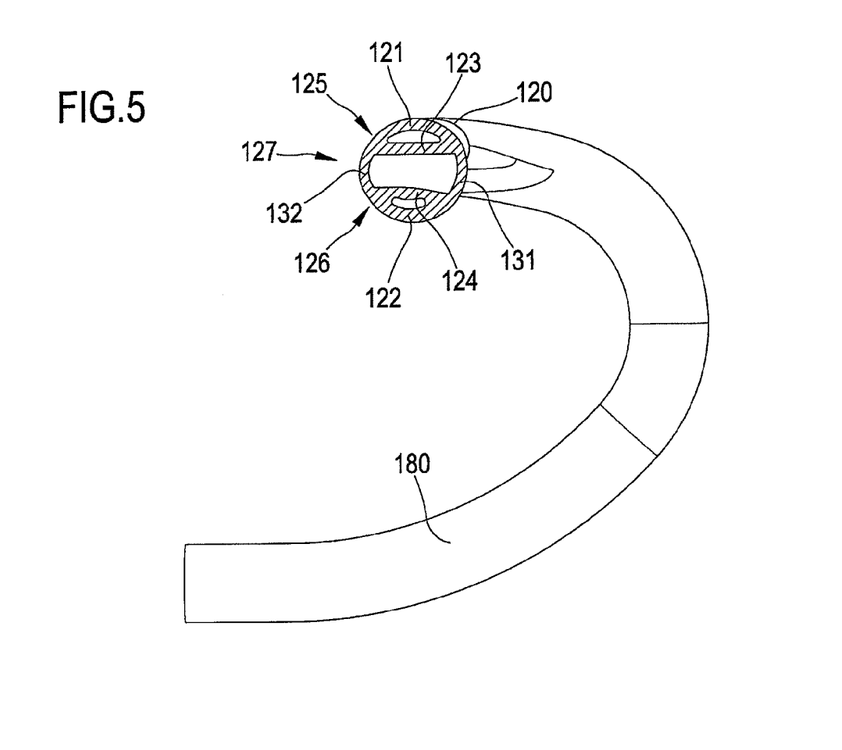
FIG. 5 is a side section view of the part of handlebars of FIG. 1.
Figure 6:
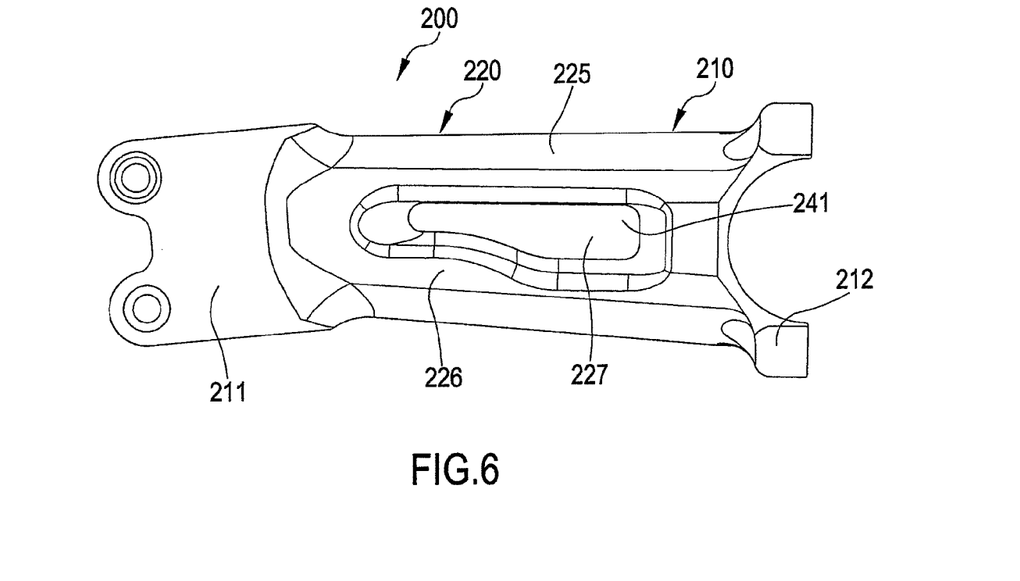
FIG. 6 is a perspective view of a rear part of handlebars (stem) according to a further embodiment of the invention.
Figure 7:
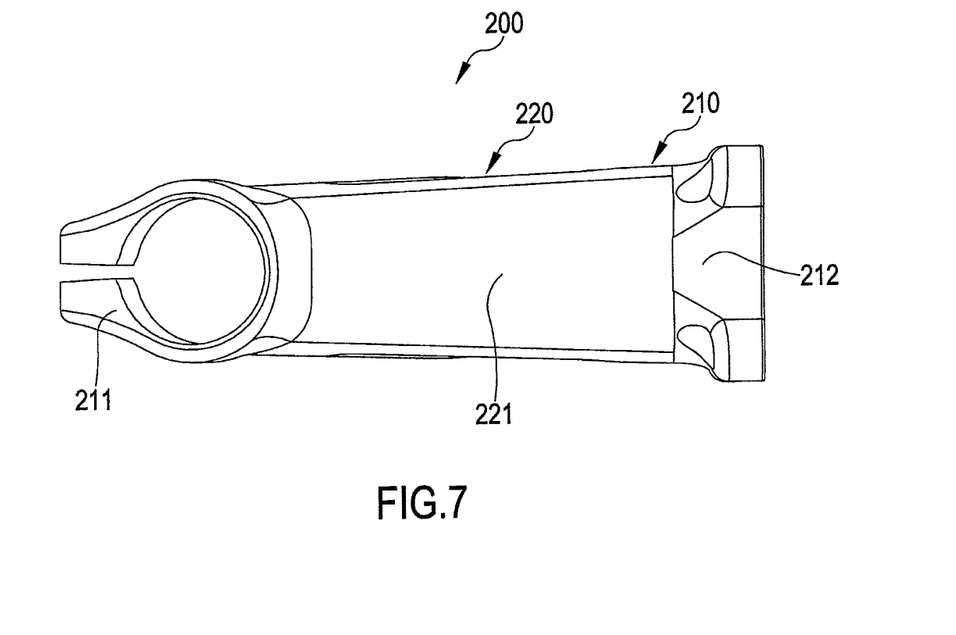
FIG. 7 is a view from above of the part of handlebars of FIG. 6.
Figure 8:
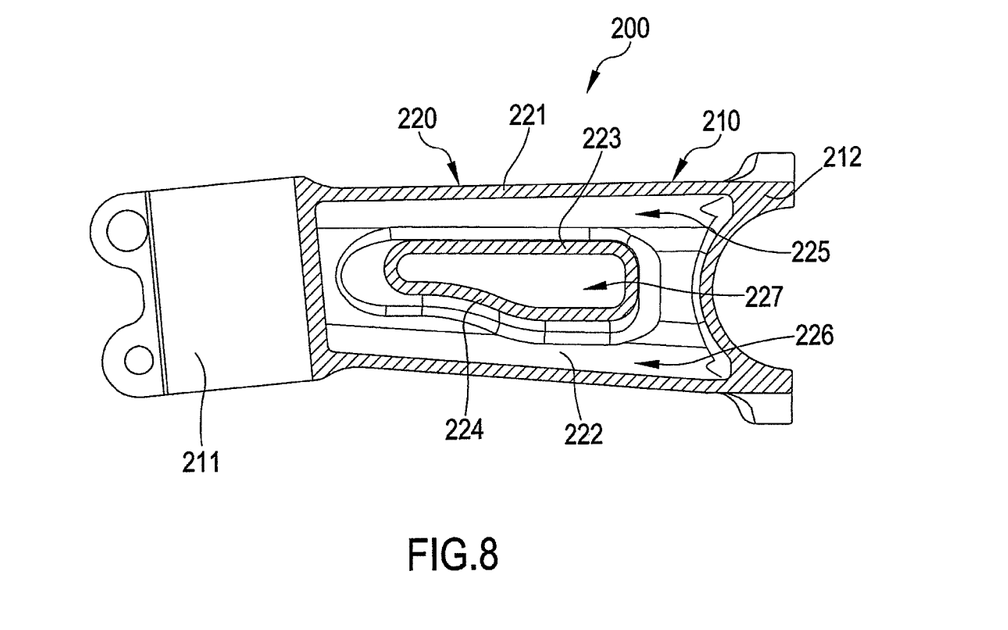
FIG. 8 is a side section view of the part of handlebars of FIG. 6.

In FIGS. 6 to 8, a rear part of handlebars is generally indicated with 200, comprising a stem 210, extending between a rear area 211 for attaching to a bicycle fork and a front area 212 for attaching to a master tube of a front part of handlebars.

The stem 210 comprises a portion with doubled section 220, in which the cross section of the stem 210 comprises an upper outer wall 221, a lower outer wall 222, an upper inner wall 223 and a lower inner wall 224. The upper outer wall 221 is distanced from and joined to the upper inner wall 223 and together they preferably form an upper tubular structure 225, having a closed section, rounded and elongated in the transversal direction of the handlebars (by this meaning, here and hereafter, the transversal direction with respect to the forward movement of the bicycle). Similarly, the lower outer wall 222 is distanced from and joined to the lower inner wall 224 and together they preferably form a lower tubular structure 226, having a closed section, rounded and elongated in the transversal direction of the handlebars. The upper inner wall 223 is distanced from the lower inner wall 224 and the two upper and lower tubular structures 225 and 226 are distinct and spaced apart; between the tubular structures 225 and 226 a gap 227 is formed that passes through the portion 220 with doubled section. Preferably, the outer walls 221 and 222 extend predominantly along sections of the same circumference, whereas the inner walls 223 and 224 extend predominantly along respective lines, straight or almost straight.

The portion with doubled section 220 extends in an intermediate position between the attachment areas 211 and 212. The inner walls 223 and 224 are preferably joined together between the portion with doubled section 220 and the adjacent areas of the stem 210. In this way, the stem 210 has a window 241 formed in it, which is open in the transversal direction, towards both sides.

The overall extension of the doubled section 220 along the stem 210 is preferably equal to no more than half of the length of the stem 210 itself.

Figure 9:
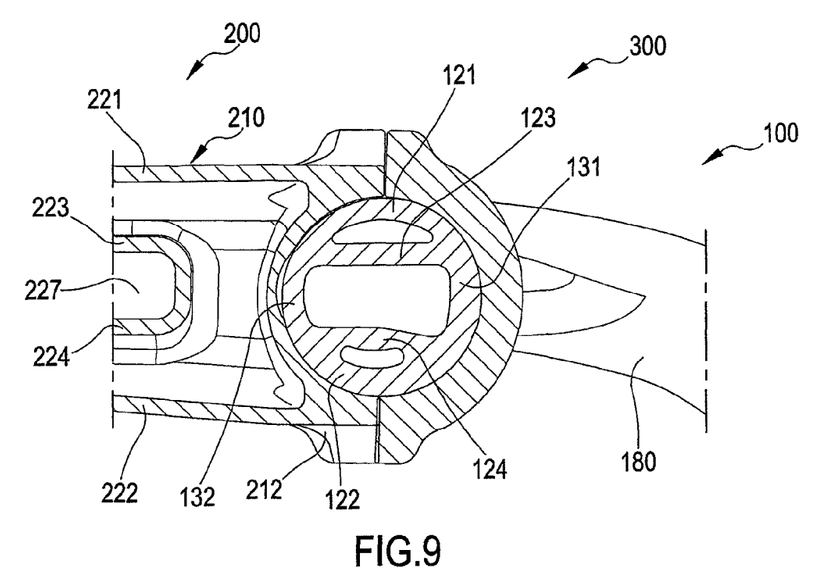
FIG. 9 is a schematic section view of handlebars according to the invention, having a front part according to the embodiment of FIG. 1 and a rear part according to the embodiment of FIG. 6.
Figure 10:
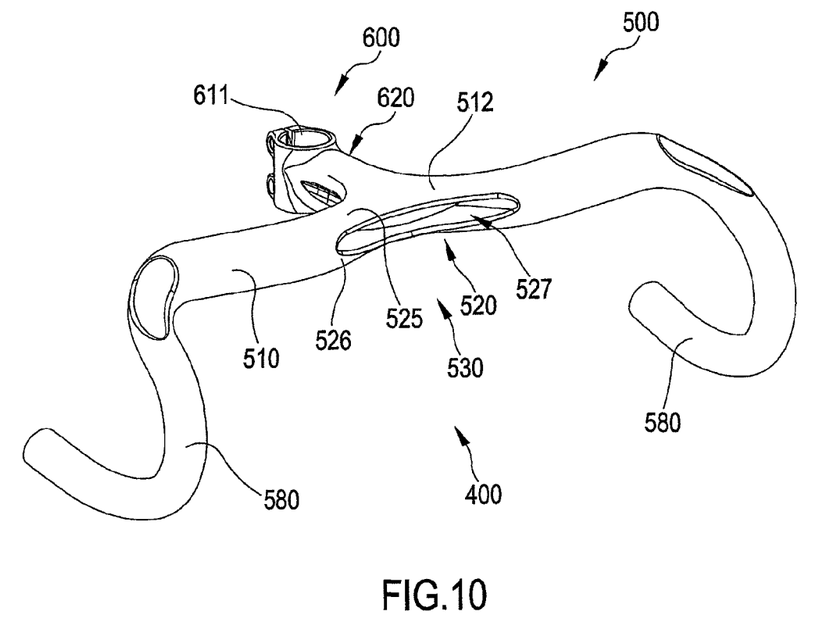
FIG. 10 is a perspective view of handlebars according to a further embodiment of the invention.
Figure 11:
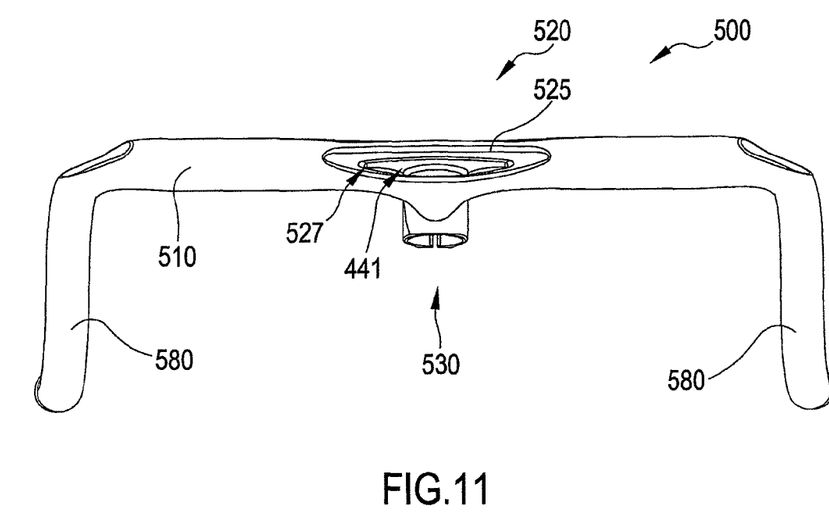
FIG. 11 is a front view of the handlebars of FIG. 10.
Figure 12:
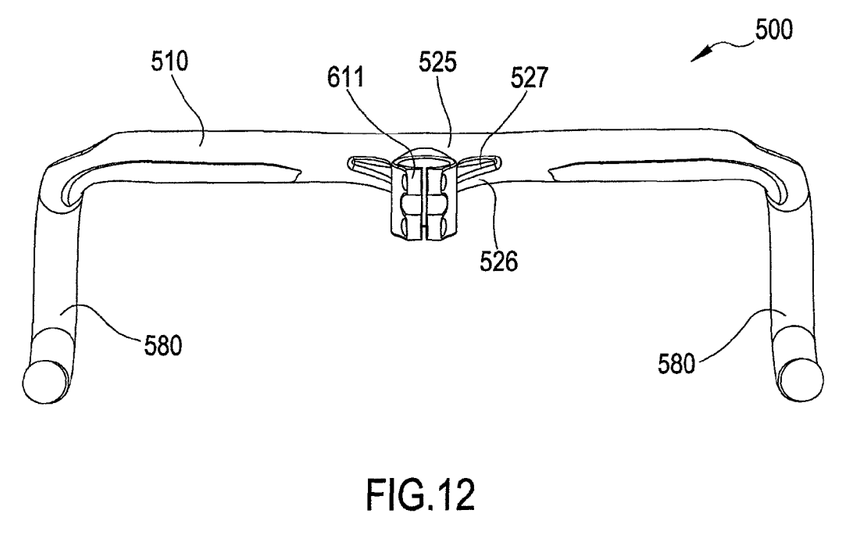
FIG. 12 is a rear view of the handlebars of FIG. 10.
Figure 13:
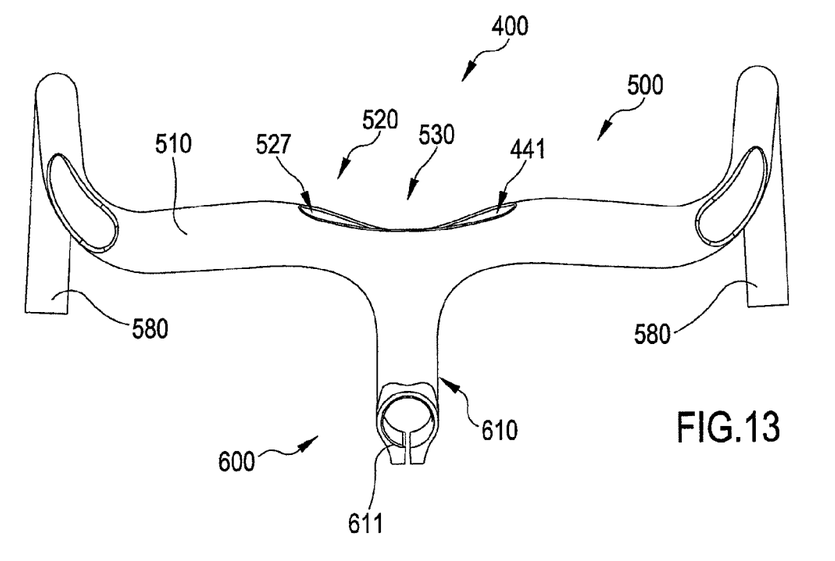
FIG. 13 is a view from above of the handlebars of FIG. 10.
Figure 14:
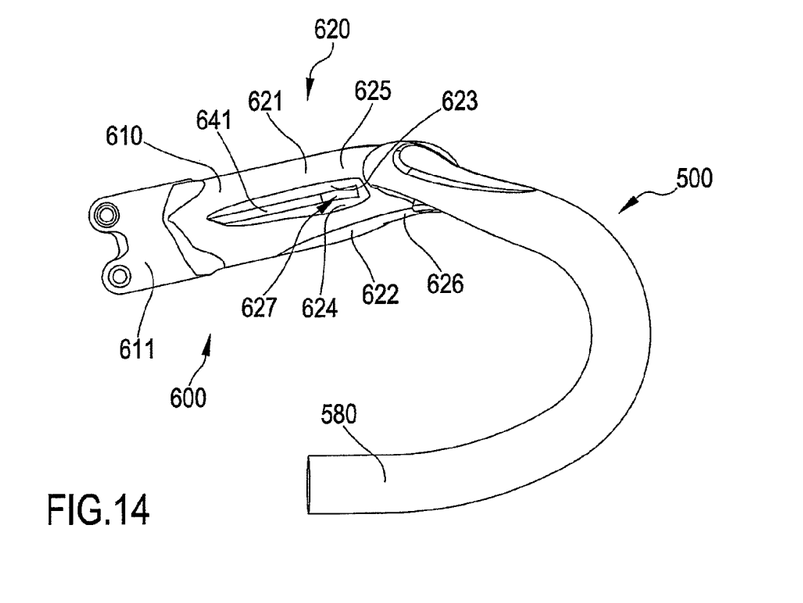
FIG. 14 is a side view of the handlebars of FIG. 10.
Figure 15:
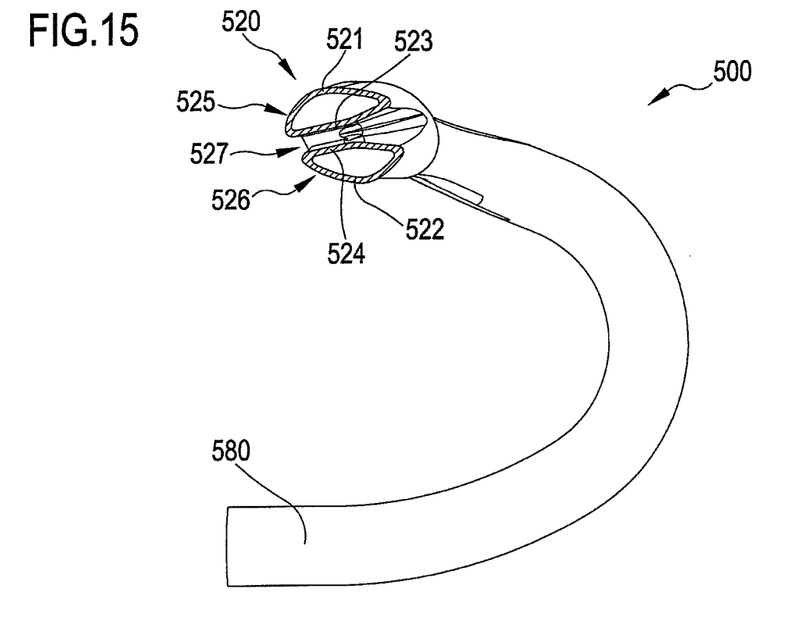
FIG. 15 is a side section view of the handlebars of FIG. 10.
Figure 16:
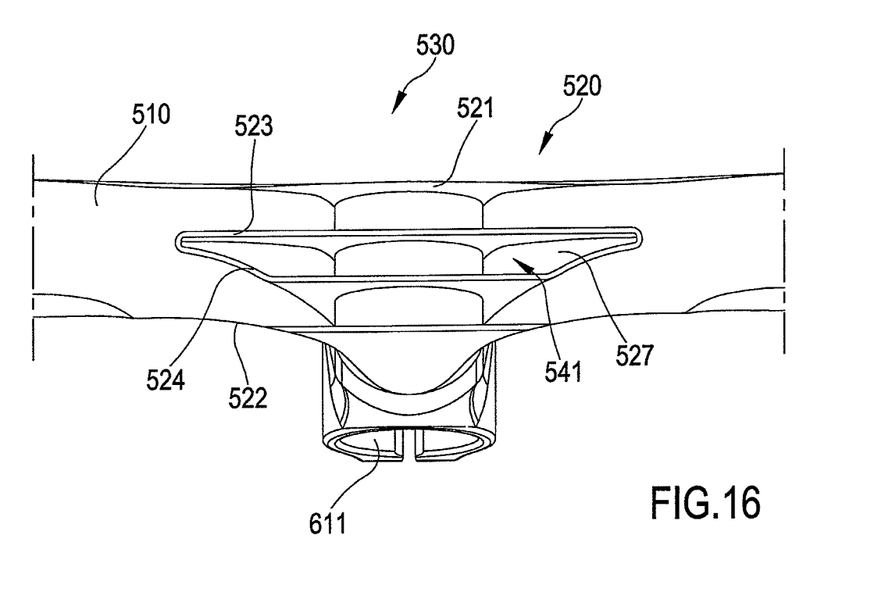
FIG. 16 is a front section view of the handlebars of FIG. 10.

FIG. 9 shows handlebars 300, comprising a front part 100 as described above with reference to FIGS. 1-5 and a rear part 200 as described with reference to FIGS. 6-8. In any case, in accordance with the invention and as already mentioned above, the front part 100 can be used in handlebars also in association with a conventional rear part, just as the rear part 200 can be used in handlebars also in association with a conventional front part. The mutual coupling between the parts 100 and 200 takes place by clamping of the attachment area 212 on the middle area 130, by means of screws or analogous means, not illustrated.

FIGS. 10 to 16 show handlebars 400, comprising a front part 500 and a rear part 600 in a single piece. The front part 500 comprises a master tube 510 at the opposite ends of which there are two handgrips 580; the two handgrips 580 are of the curved type, and they are formed in a single piece with the master tube 510; of course, the handgrips 580 could be any other shape, for example straight. The rear part 600 comprises a stem 610 with a portion 611 for attaching to a bicycle fork.

The master tube 510 comprises at least one portion with doubled section 520, in which the cross section of the master tube 510 comprises an upper outer wall 521, a lower outer wall 522, an upper inner wall 523 and a lower inner wall 524. The upper outer wall 521 is distanced from and joined to the upper inner wall 523 and together they preferably form an upper tubular structure 525, having a closed section, rounded and elongated in the longitudinal direction of the handlebars. Similarly, the lower outer wall 522 is distanced from and joined to the lower inner wall 524 and together they preferably form a lower tubular structure 526, having a closed section, rounded and elongated in the longitudinal direction of the handlebars. The upper inner wall 523 is distanced from the lower inner wall 524 and the two upper and lower tubular structures 525 and 526 are distinct and spaced apart; between the tubular structures 525 and 526 a gap 527 is formed that passes through the portion 520 with doubled section. Preferably, the outer walls 521 and 522 extend predominantly along sections of the same circumference, whereas the inner walls 523 and 524 extend predominantly along respective lines, straight or almost straight.

The stem 610 comprises a portion with doubled section 620, in which the cross section of the stem 610 comprises an upper outer wall 621, a lower outer wall 622, an upper inner wall 623 and a lower inner wall 624. The upper outer wall 621 is distanced from and joined to the upper inner wall 623 and together they preferably form an upper tubular structure 625, having a closed section, rounded and elongated in the transversal direction of the handlebars 400. Similarly, the lower outer wall 622 is distanced from and joined to the lower inner wall 624 and together they preferably form a lower tubular structure 626, having a closed section, rounded and elongated in the transversal direction of the handlebars 400. The upper inner wall 623 is distanced from the lower inner wall 624 and the two upper and lower tubular structures 625 and 626 are distinct and spaced apart; between the tubular structures 625 and 626 a gap 627 is formed that passes through the portion 620 with doubled section. Preferably, the outer walls 621 and 622 extend predominantly along sections of the same circumference, whereas the inner walls 623 and 624 extend predominantly along respective lines, straight or almost straight.

The portion with doubled section 520 is provided at a middle area 530 of the master tube 510, where the master tube 510 is joined to the stem 610; in all of the middle area 530, the portion with doubled section 520 does not provide joining walls between the outer walls 521 and 523. The inner walls 523 and 524 are preferably joined together between the portion with doubled section 520 and the adjacent areas of the master tube 510.

The portion with doubled section 620 extends in a front position in the stem 610. The inner walls 623 and 624 are preferably joined together between the portion with doubled section 620 and the adjacent rear area of the stem 610; for this purpose, there is a substantially V-shaped wall 641, in plan view from above or from below.

The gap 527 in the master tube 510 and the gap 627 in the stem 610 face one another, without substantial solution of continuity. In this way, in the handlebars 400, between the master tube 510 and the stem 610, a single window 441 is formed, open both in the longitudinal direction forwards and backwards, and in the transversal direction, towards both sides. In fact, therefore, the portion with doubled section 520 of the master tube 510 and the portion with doubled section 620 of the stem 610 form a single portion with doubled section.

It should be noted that the V-shape of the wall 641 promotes the aerodynamics of the handlebars 400, since it gradually spreads the air flow that enters at the front of the window 441 during travel, deviating it on the two sides of the attachment portion 611.

The overall extension of the doubled section 520 along the master tube 510 is preferably equal to no more than half of the length of the master tube 510 itself. The overall extension of the doubled section 620 along the stem 610 is preferably equal to no more than half of the length of the stem 610 itself.

Figure 17:
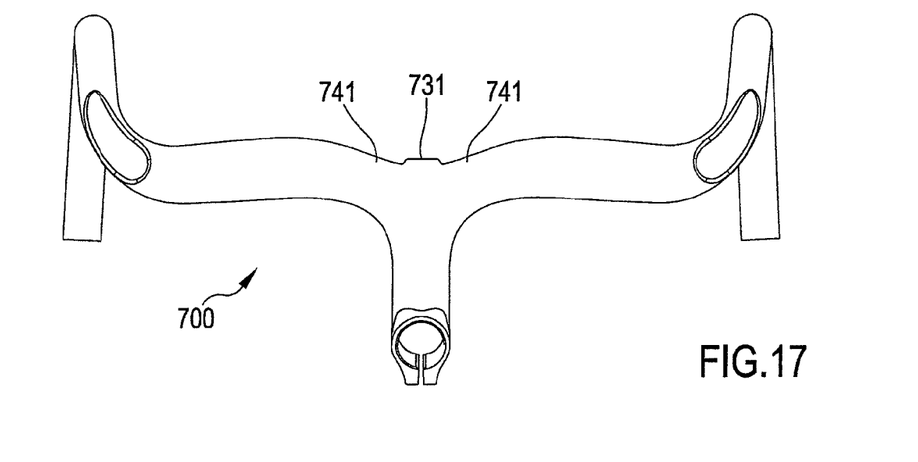
FIG. 17 is a view from above of handlebars according to a further embodiment of the invention.

FIG. 17 shows handlebars 700, substantially the same as the handlebars 400, apart from the presence of a front joining wall 731, which forms two separate windows 741 on front. All of the other details of the handlebars 700 are the same as those of the handlebars 400 and therefore they will not be described here, nor are they marked with reference numerals in FIG. 17.

Figure 18:
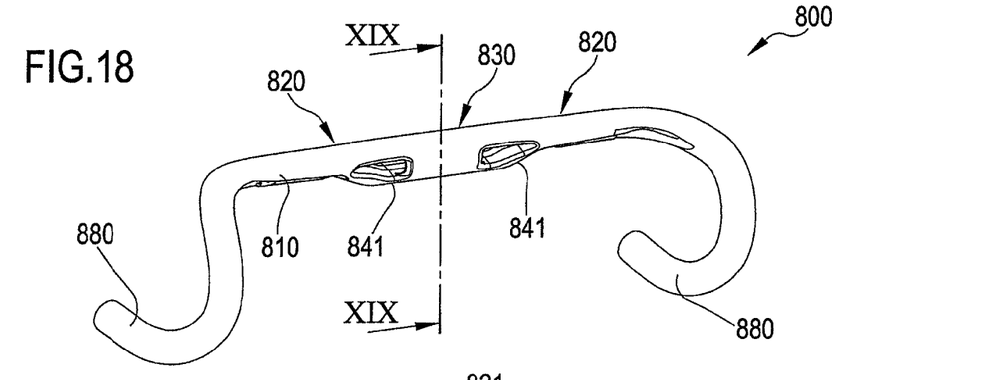
FIG. 18 is a perspective view of a front part of handlebars according to a further embodiment of the invention.
Figure 19:
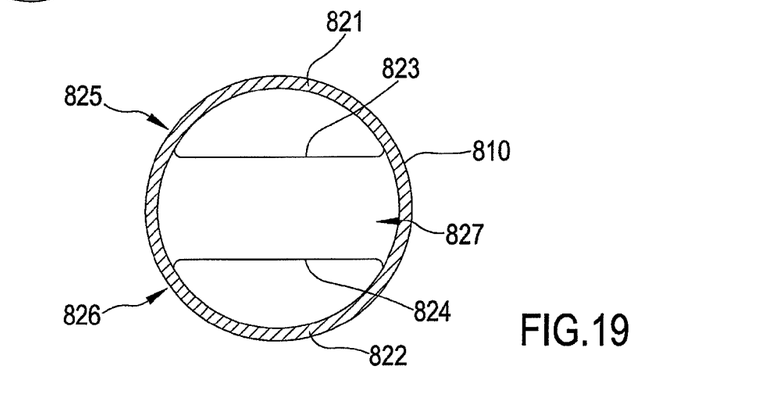
FIG. 19 is a section view of the front part of handlebars of FIG. 18, according to the direction shown by the arrows XIX-XIX.

FIGS. 18 and 19 show a front part 800 of handlebars, partially analogous to the front part 100 of handlebars, with a master tube 810 and two handgrips 880. Unlike the front part 100, in the middle area 830 of the master tube 810, where the master tube is connected to the stem, there is no portion with doubled section; on the other hand, two separate portions with doubled section 820 are provided, between the middle area 830 and the ends of the master tube. In this case, the two portions with doubled section 820 extend overall for no more than half of the length of the master tube 810. In each portion 820, there is an upper outer wall 821, a lower outer wall 822, an upper inner wall 823 and a lower inner wall 824, with formation of an upper tubular structure 825 and a lower tubular structure 826, separated by a gap 827. In each portion 820, a respective window 841 is thus formed.

Handlebars according to what has been described, both in terms of its front part and in terms of its rear part, can be made preferably from composite material, with structural fibers bound by a resin matrix.

In any case, handlebars according to the invention make it possible to avoid possible structural yielding occurring suddenly, since the structure with doubled section promotes relatively gradual yielding.

Moreover, the doubled section, particularly in the front part of the handlebars, ensures better aerodynamics of the handlebars and also better strength in the attachment area of the front part to the rear part, when they are made in distinct pieces.

The invention claimed is:

1. Bicycle handlebars, comprising:
a master tube of a predetermined length having a handgrip at each end thereof and at least one doubled section portion, at a middle area of the master tube, that is no greater than half the length of the master tube, is centered about the middle area of the master tube, extends towards the ends of the master tube, and has a cross section comprised of an upper outer wall, a lower outer wall, an upper inner wall, and a lower inner wall, wherein:
a) the upper outer wall is distanced from and joined to the upper inner wall, the upper outer wall and upper inner wall forming an upper tubular structure;
b) the lower outer wall is distanced from and joined to the lower inner wall, the lower outer wall and lower inner wall forming a lower tubular structure;
c) the upper inner wall is distanced from the lower inner wall and the upper and lower tubular structures being distinct from each other and spaced apart to define a gap that passes through said at least one doubled section portion; and,
a stem formed in a single piece with the at least one doubled section portion of the master tube, wherein the stem attaches the master tube to a bicycle fork, and the at least one doubled section portion extends both in the master tube and in the stem.

2. Handlebars according to claim 1, wherein the master tube is made from composite material including structural fibres bound by a resin matrix.

3. Handlebars according to claim 1, wherein the stem is made from composite material including structural fibres bound by a resin matrix.

4. Handlebars according to claim 1, wherein said at least one doubled section portion extends for no more than half of the length of the stem.

5. Handlebars according to claim 1, wherein the upper and lower tubular structures each have a rounded elongated section; the outer walls extending predominantly along a section of a circumference, each of the inner walls extending through the elongated section in a respective straight line that remains spaced from another respective straight line through the elongated section.

6. Handlebars according to claim 5, wherein the gap between the upper and lower tubular structures is substantially constant through the elongated sections.

* * * * *